(12) United States Patent
Graves et al.

(10) Patent No.: US 8,452,335 B2
(45) Date of Patent: May 28, 2013

(54) METHODS AND SYSTEMS FOR INCREASING WIRELESS TRAFFIC CAPACITY IN THE VICINITY OF AN EVENT SITE

(75) Inventors: Alan Graves, Kanata (CA); Jeffrey Fitchett, Kanata (CA); Brian Vezza, Allen, TX (US); John Watkins, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/620,411

(22) Filed: Sep. 14, 2012

(65) Prior Publication Data
US 2013/0029673 A1    Jan. 31, 2013

Related U.S. Application Data

(62) Division of application No. 11/641,031, filed on Dec. 19, 2006.

(51) Int. Cl.
*H04W 40/00* (2009.01)

(52) U.S. Cl.
USPC ............ 455/562.1; 455/422.1; 455/446; 455/424

(58) Field of Classification Search
USPC .......... 455/446, 453, 423, 562.1, 422.1–425, 455/67.11–67.16
See application file for complete search history.

(56) References Cited

U.S. PATENT DOCUMENTS

| | | | |
|---|---|---|---|
| 5,095,500 A * | 3/1992 | Tayloe et al. ............. 379/32.01 |
| 5,179,722 A * | 1/1993 | Gunmar et al. ............. 455/446 |
| 5,285,494 A * | 2/1994 | Sprecher et al. ............. 455/423 |
| 5,561,841 A * | 10/1996 | Markus ............. 455/446 |
| 5,884,187 A | 3/1999 | Ziv et al. |
| 6,091,788 A * | 7/2000 | Keskitalo et al. ............. 375/347 |
| 6,115,599 A * | 9/2000 | Stilp ............. 455/404.1 |
| 6,141,565 A * | 10/2000 | Feuerstein et al. ............. 455/560 |
| 6,256,489 B1 | 7/2001 | Lichter et al. |
| 6,275,704 B1 * | 8/2001 | Dixon ............. 455/446 |
| 6,421,005 B1 | 7/2002 | Weaver et al. |
| 6,781,960 B1 | 8/2004 | Charas |
| 6,882,845 B2 | 4/2005 | Sato et al. |
| 7,120,436 B2 | 10/2006 | Kim |
| 7,280,799 B1 * | 10/2007 | Najafi et al. ............. 455/11.1 |
| 7,292,860 B2 | 11/2007 | Tobe et al. |
| 7,398,106 B2 | 7/2008 | Conyers et al. |
| 7,400,597 B2 | 7/2008 | Cai et al. |
| 7,400,888 B2 * | 7/2008 | Smith et al. ............. 455/452.1 |
| 7,457,641 B1 | 11/2008 | Legnain et al. |

(Continued)

*Primary Examiner* — Sharad Rampuria
(74) *Attorney, Agent, or Firm* — Fish & Richardson P.C.

(57) ABSTRACT

Network entity, method and computer-readable storage medium for use in a network that includes an arrangement of cell sites, each cell site configured to provide wireless services within a respective coverage region. The network entity may include an input configured to receive position information regarding occurrence of an event at an event site, and a processing entity configured to determine, based on the position information regarding occurrence of the event and policy information regarding the network, whether the event warrants coverage region reconfiguration and, if so, to generate a message commanding an adjustment to the coverage region of at least one cell site. An output is configured to release the message towards the at least one cell site, whereby application of the adjustment to the coverage region of the at least one cell site enables an increase in traffic to be accommodated in a vicinity of the event site.

16 Claims, 13 Drawing Sheets

U.S. PATENT DOCUMENTS

| | | |
|---|---|---|
| 7,565,151 B2 | 7/2009 | Sano |
| 7,583,978 B2 | 9/2009 | Miyajima et al. |
| 7,664,492 B1 * | 2/2010 | Lee et al. .................. 455/424 |
| 8,045,989 B2 * | 10/2011 | Joo .............................. 455/446 |
| 2002/0082023 A1 | 6/2002 | Bark et al. |
| 2003/0003918 A1 | 1/2003 | Proctor et al. |
| 2003/0058824 A1 | 3/2003 | Petterson et al. |
| 2003/0114165 A1 | 6/2003 | Mills |
| 2004/0259581 A1 | 12/2004 | Crisler et al. |
| 2005/0176419 A1 * | 8/2005 | Triolo et al. .................. 455/423 |
| 2005/0227699 A1 | 10/2005 | Schreuder et al. |
| 2005/0272472 A1 * | 12/2005 | Goldberg et al. .......... 455/562.1 |
| 2006/0111118 A1 | 5/2006 | Hironen et al. |
| 2006/0142021 A1 | 6/2006 | Mueckenheim et al. |
| 2007/0026871 A1 | 2/2007 | Wager |
| 2007/0030144 A1 | 2/2007 | Titus et al. |
| 2008/0039089 A1 | 2/2008 | Berkman et al. |

* cited by examiner

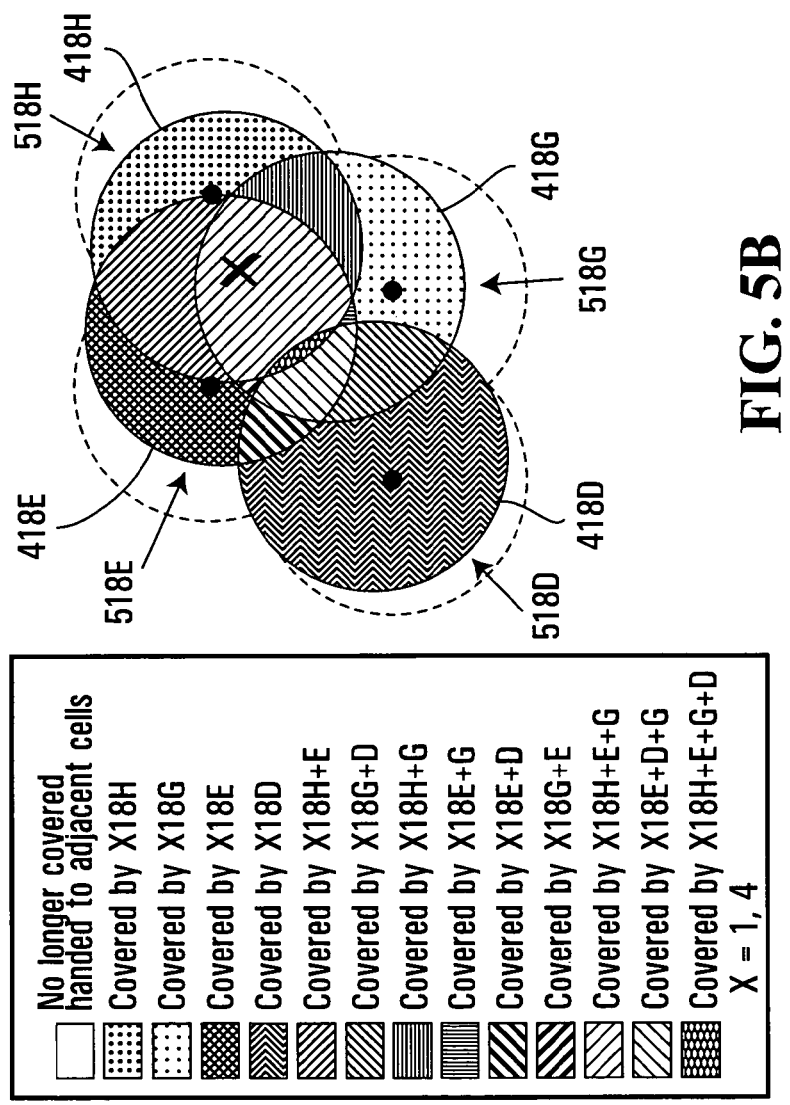
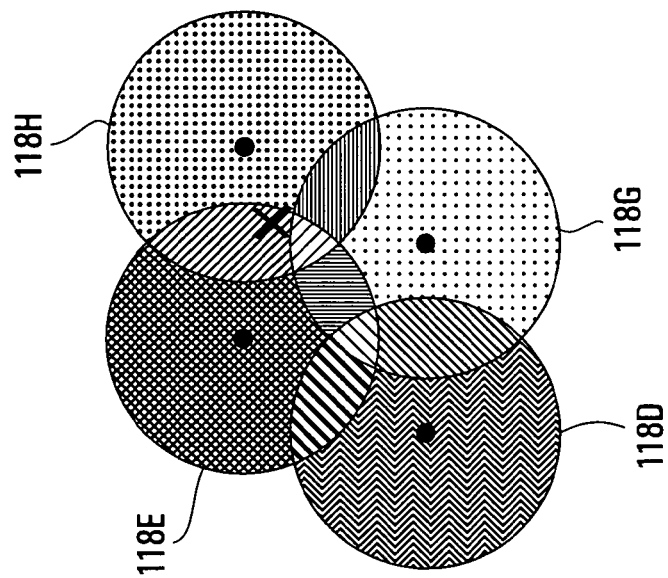
FIG. 5B
FIG. 5A

| Cell | 118C | | 118E | | | 118H | | | 118M | |
|---|---|---|---|---|---|---|---|---|---|---|
| Cell component | 118C | 118C/E | 118C/E | 118E | 118E/H | 118E/H | 118H | 118H/M | 118H/M | 118M |
| # of users | 47 | 13 | 13 | 37 | 14 | 14 | 33 | 14 | 14 | 45 |
| Load factor | 1 | 0.5 | 0.5 | 1 | 0.5 | 0.5 | 1 | 0.5 | 0.5 | 1 |
| Load | 47 | 6.5 | 6.5 | 37 | 7 | 7 | 33 | 7 | 7 | 45 |
| Total load | 53.5 | | 50.5 | | | 47 | | 52 | | |

FIG. 6B

| Cells | 418C | | | 418E | | | | | 418H | | | | | 418M | | | Unc |
|---|---|---|---|---|---|---|---|---|---|---|---|---|---|---|---|---|---|
| Cell component | 418 C | 418 C/E | 418C /E/H | 418C /E/H | 418C /E | 418 E | 418E /H | 418E /H/M | 418C /E/H/ | 418E /H | 418 H | 418 H/M | 418E/ H/M | 418E /H/M | 418 H/M | 418 M | |
| # of users | 54 | 9 | 1 | 1 | 9 | 8 | 41 | 1 | 1 | 41 | 9 | 9 | 1 | 1 | 9 | 54 | 9+9 |
| Load factor | 1 | 0.5 | 0.33 | 0.33 | 0.5 | 1 | 0.5 | 0.33 | 0.33 | 0.5 | 1 | 0.5 | 0.33 | 0.33 | 0.5 | 1 | 0 |
| Load | 54 | 4.5 | 0.33 | 0.33 | 4.5 | 8 | 20.5 | 0.33 | 0.33 | 20.5 | 9 | 4.5 | 0.33 | 0.33 | 4.5 | 54 | 0 |
| Total load | 58.83 | | | 33.67 | | | | | 34.67 | | | | | 58.83 | | | |

FIG. 6D

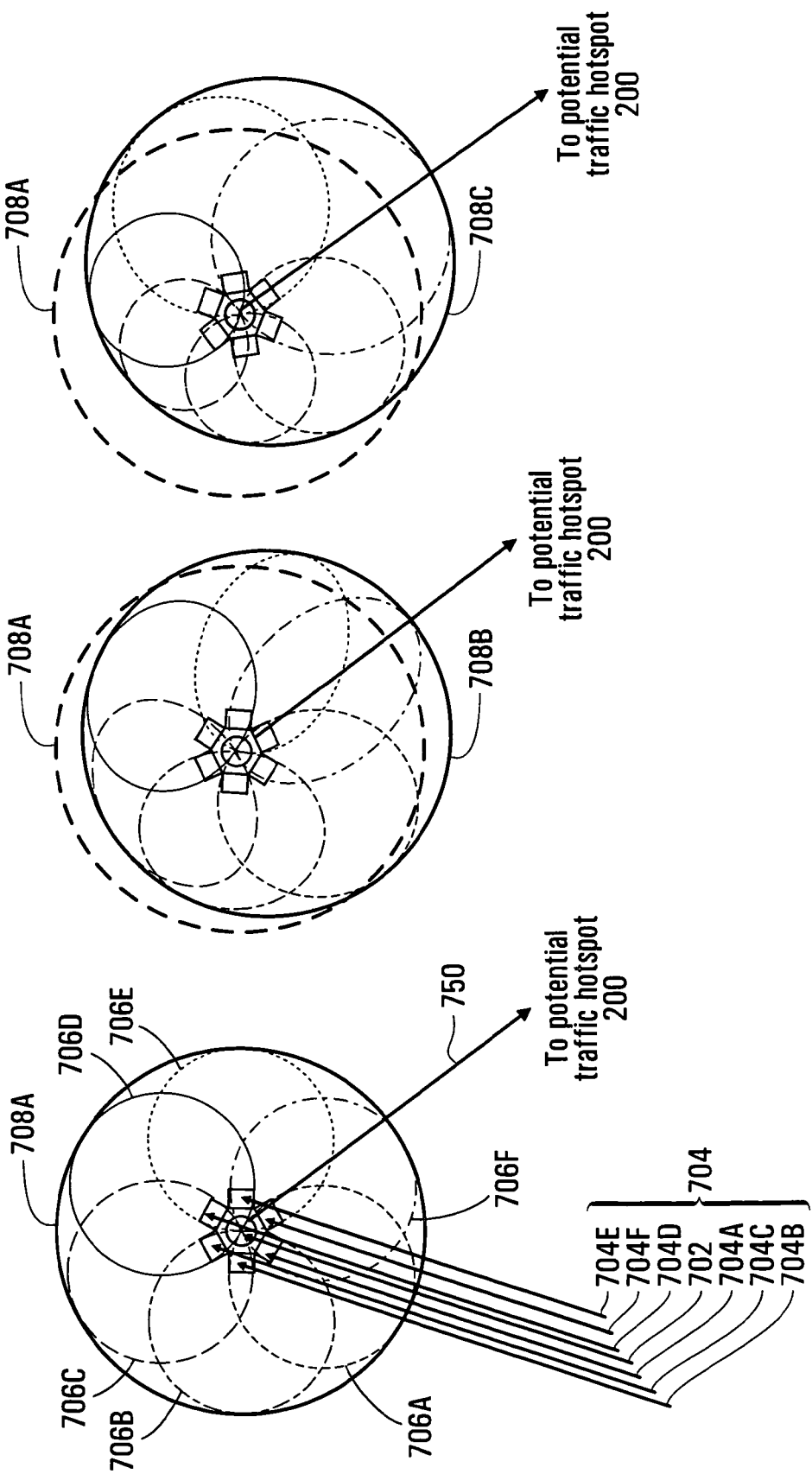

METHODS AND SYSTEMS FOR INCREASING WIRELESS TRAFFIC CAPACITY IN THE VICINITY OF AN EVENT SITE

CROSS-REFERENCE TO RELATED APPLICATIONS

This application is a divisional of and claims priority to U.S. patent application Ser. No. 11/641,031, filed on Dec. 19, 2006, the disclosure of which is hereby incorporated by reference.

FIELD OF THE INVENTION

The present invention relates generally to wireless communications and, in particular, to methods and systems for increasing the capacity of a wireless communications system in the vicinity of a location where the demand for wireless services is expected to rise abruptly, due to unforeseen or expected events at that location.

BACKGROUND

Certain critical events such as certain natural or man-made disasters, major accidents or terrorist attacks, as well as the response to these events, bring about a wireless telecommunications imbalance whereby a small geographic area can experience a sudden and substantial increased demand for wireless services. In the minutes and hours following such an event, a large volume of people require wireless telecommunications services in a very limited geographical area. Unfortunately, a large number of potential calls, many among them important calls related to health or safety, will not make it through to their destination due to insufficient wireless capacity in the vicinity of the event site.

In an effort to alleviate the communications difficulties that such a situation can create, certain wireless telecommunications providers have opted to create a system whereby in an emergency, the capacity of the wireless network in the vicinity of the emergency would be exclusively reserved for authorized emergency services personnel. In so doing, existing calls would be dropped, and only authorized personnel would be permitted to place new ones. Unfortunately, this solution ignores a practical reality, namely that many important calls placed immediately following a major disaster event are likely to come both from authorized personnel, and from emergency personnel who are not on the applicable work shift using their private cell phones, for example. Other calls tend to be placed by eyewitnesses who are able to give descriptions of ongoing situations above or under the ground, where emergency personnel are not necessarily present and from victims isolated or trapped by the disaster event. Thus, it is illusory and unwise to assume that reserving the wireless spectrum exclusively for authorized personnel during an emergency would achieve the goal of increased public safety. Furthermore, just as a disaster event creates a heavy load on the public network around the disaster site, it can also generate a heavy load on any emergency network in place across the city, state or country in which the event site is located.

In view of these and other inadequacies of prior art solutions, the need remains to improve the management of a wireless network in the vicinity of a location where the demand for wireless services is expected to rise abruptly, particularly following a critical event such as a disaster.

SUMMARY OF THE INVENTION

A first broad aspect of the present invention seeks to provide a network entity for use in a network that includes an arrangement of cell sites, each said cell site being configured to provide wireless services to users within a respective coverage region. The network entity comprises an input configured to receive position information regarding occurrence of an event at an event site; a processing entity configured to determine on a basis of a set of factors including (i) the position information regarding occurrence of the event and (ii) policy information regarding the network, whether the event warrants coverage region reconfiguration and, if so, to generate a message commanding an adjustment to the coverage region of at least one of said cell sites; an output configured to release said message towards said at least one of said cell sites, whereby application of said adjustment to the coverage region of said at least one of said cell sites enables an increase in traffic to be accommodated in a vicinity of said event site.

A second broad aspect of the present invention seeks to provide a network entity for use in a network that includes an arrangement of cell sites, each said cell site being configured to provide wireless services to users within a respective coverage region.

The network entity comprises means for receiving position information regarding occurrence of an event at an event site; means for determining on a basis of a set of factors including (i) the position information regarding occurrence of the event and (ii) policy information regarding the network, whether the event warrants coverage region reconfiguration and, if so, generating a message commanding an adjustment to the coverage region of at least one of said cell sites; and means for releasing said message towards said at least one of said cell sites, whereby application of said adjustment to the coverage region of said at least one of said cell sites enables an increase in traffic to be accommodated in a vicinity of said event site.

A third broad aspect of the present invention seeks to provide a method for execution by an entity of a network that includes an arrangement of cell sites, each said cell site being configured to provide wireless services to users within a respective coverage region. The method comprises receiving position information regarding occurrence of an event at an event site; determining on a basis of a set of factors including (i) the position information regarding occurrence of the event and (ii) policy information regarding the network, whether the event warrants coverage area reconfiguration and, if so, generating a message commanding an adjustment to the coverage region of at least one of said cell sites; releasing said message towards said at least one of said cell sites, whereby application of said adjustment to the coverage region of said at least one of said cell sites enables an increase in traffic to be accommodated in a vicinity of said event site.

A fourth broad aspect of the present invention seeks to provide a computer-readable storage medium comprising computer-readable program code executable by an entity of a network that includes an arrangement of cell sites, each said cell site being configured to provide wireless services to users within a respective coverage region. The computer-readable program code comprises first computer-readable program code for causing the network entity to be attentive to receipt of position information regarding occurrence of an event at an event site; second computer-readable program code for causing the network entity to determine on a basis of a set of factors including (i) the position information regarding occurrence of the event and (ii) policy information regarding the network, whether the event warrants coverage area reconfiguration and, if so, to generate a message commanding an adjustment to the coverage region of at least one of said cell sites; and third computer-readable program code for causing the network entity to release said message towards said at least one of said cell sites, whereby application of said adjustment to the coverage region of said at least one of said cell sites enables an increase in traffic to be accommodated in a vicinity of said event site.

A fifth broad aspect of the present invention seeks to provide a network entity for use in a network that includes an arrangement of cell sites, each said cell site being configured to provide wireless services to users within a respective coverage region. The network entity comprises an input configured to receive (i) position information regarding an event site and (ii) a message commanding a coverage region reconfiguration; a processing entity configured to determine on a basis of a set of factors including (i) the position information regarding the event site, (ii) the message commanding a coverage region reconfiguration and (iii) position information regarding the cell sites, an individual adjustment to the respective coverage region of at least one of said cell sites; and an output configured to release a command to each of said at least one of said cell sites, said command for instructing the respective cell site to apply said individual adjustment to its respective coverage region.

A sixth broad aspect of the present invention seeks to provide a network entity for use in a network that includes an arrangement of cell sites, each said cell site being configured to provide wireless services to users within a respective coverage region. The network entity comprises means for receiving (i) position information regarding an event site and (ii) a message commanding a coverage region reconfiguration; means for determining on a basis of a set of factors including (i) the position information regarding the event site, (ii) the message commanding a coverage region reconfiguration and (iii) position information regarding the cell sites, an individual adjustment to the respective coverage region of at least one of said cell sites; and means for releasing a command to each of said at least one of said cell sites, said command for instructing the respective cell site to apply said individual adjustment to its respective coverage region.

A seventh broad aspect of the present invention seeks to provide a method for execution by an entity of a network that includes an arrangement of cell sites, each said cell site being configured to provide wireless services to users within a respective coverage region. The method comprises receiving (i) position information regarding an event site and (ii) a message commanding a coverage region reconfiguration; determining on a basis of a set of factors including (i) the position information regarding the event site, (ii) the message commanding a coverage region reconfiguration and (iii) position information regarding the cell sites, an individual adjustment to the respective coverage region of at least one of said cell sites; and releasing a command to each of said at least one of said cell sites, said command for instructing the respective cell site to apply said individual adjustment to its respective coverage region.

An eighth broad aspect of the present invention seeks to provide a computer-readable storage medium comprising computer-readable program code executable by an entity of a network that includes an arrangement of cell sites, each said cell site being configured to provide wireless services to users within a respective coverage region. The computer-readable program code comprises first computer-readable program code for causing the network entity to be attentive to receipt of (i) position information regarding an event site and (ii) a message commanding a coverage region reconfiguration; second computer-readable program code for causing the network entity to determining on a basis of a set of factors including (i) the position information regarding the event site, (ii) the message commanding a coverage region reconfiguration and (iii) position information regarding the cell sites, an individual adjustment to the respective coverage region of at least one of said cell sites; and third computer-readable program code for causing the network entity to release a command to each of said at least one of said cell sites, said command for instructing the respective cell site to apply said individual adjustment to its respective coverage region.

A ninth broad aspect of the present invention seeks to provide a cell site for use in a wireless network. The cell site comprises an antenna subsystem having antenna response characteristics that allow the cell site to provide wireless services to users within a coverage region; and a control entity, said control entity configured to receive a message instructing the cell site to apply an adjustment to the coverage region and, in response, to adjust the antenna response characteristics of the antenna subsystem to move the coverage region towards an event site.

A tenth broad aspect of the present invention seeks to provide a method for execution by a cell site used in a wireless network. The method comprises exhibiting antenna response characteristics that allow the cell site to provide wireless services to users within a coverage region; and receiving a message instructing the cell site to apply an adjustment to the coverage region and, in response, adjusting the antenna response characteristics of the antenna subsystem to move the coverage region towards an event site.

An eleventh broad aspect of the present invention seeks to provide a wireless network, comprising: an arrangement of cell sites, each said cell site being configured to provide wireless services to users within a respective coverage region that is a function of antenna response characteristics for that cell site; and at least one network entity configured to respond to occurrence of an event at an event site by releasing a reconfiguration command towards at least one of said cell sites. The at least one of said cell sites are configured to respond to said reconfiguration command by adjusting the antenna response characteristics for the respective cell site, thereby to move the respective coverage region towards said event site.

A twelfth broad aspect of the present invention seeks to provide a network entity for use in a network that includes an arrangement of cell sites, each said cell site being configured to provide wireless services to users within a respective coverage region. The network entity comprises an input configured to receive position information regarding occurrence of an event at an event site and information regarding a nature of the event; a processing entity configured to determine on a basis of the position information regarding occurrence of the event and the information regarding the nature of the event, whether the event is sufficiently critical to require an emergency response and, if so, to generate a first message commanding an adjustment to the coverage region of at least one of said cell sites and a second message commanding a response from an emergency response agency; and an output configured to release said first message towards said at least one of said cell sites and said second message towards the emergency response agency.

A thirteenth broad aspect of the present invention seeks to provide a method for execution by an entity of a network that includes an arrangement of cell sites, each said cell site being configured to provide wireless services to users within a respective coverage region. The method comprises receiving position information regarding occurrence of an event at an event site and information regarding a nature of the event; determining on a basis of the position information regarding occurrence of the event and the information regarding the nature of the event, whether the event is sufficiently critical to require an emergency response and, if so, to generating a first message commanding an adjustment to the coverage region of at least one of said cell sites and a second message commanding a response from an emergency response agency; releasing said first message towards said at least one of said cell sites; and releasing said second message towards the emergency response agency.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 5A is a plan view of a subset of the coverage regions of FIG. 2 prior to being reconfigured in response to detection of the event, illustrating an agglomerated coverage region with a number of sub-areas covered by different combinations of cells sites;

FIG. 5B is a plan view of a subset of the coverage regions of FIG. 2 after being reconfigured in response to detection of the event, illustrating an agglomerated post-reconfiguration coverage region with a number of sub-areas covered by different combinations of cells sites;

FIG. 6B is a table that tallies the total load on each of the cell sites in the pre-reconfiguration scenario of FIG. 6A;

FIG. 6D is a table that tallies the total load on each of the cell sites in the post-reconfiguration scenario of FIG. 6C;

FIG. 7A is a plan view of a cell site and an associated coverage region in a quiescent state;

FIG. 7B is similar to FIG. 7A but shows translation of the coverage region in the direction of the event site, in accordance with a non-limiting embodiment of the present invention;

FIG. 7C is similar to FIG. 7A but shows translation of the coverage region in the direction of the event site, in accordance with another non-limiting embodiment of the present invention;

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
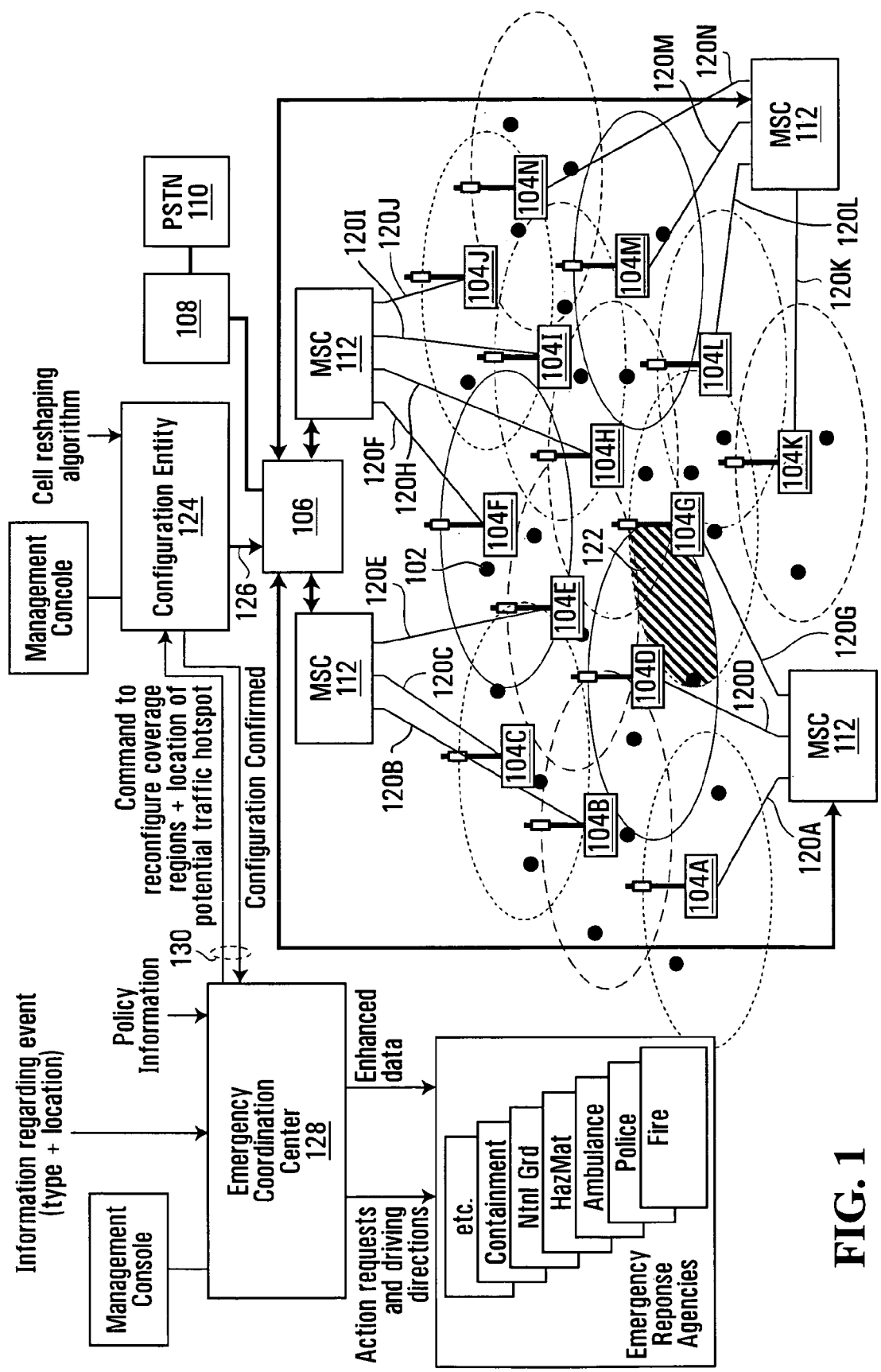
FIG. 1 depicts a cellular architecture for delivering wireless communication services to a plurality of mobile users, which includes a response coordination entity and a configuration entity.
Figure 2:
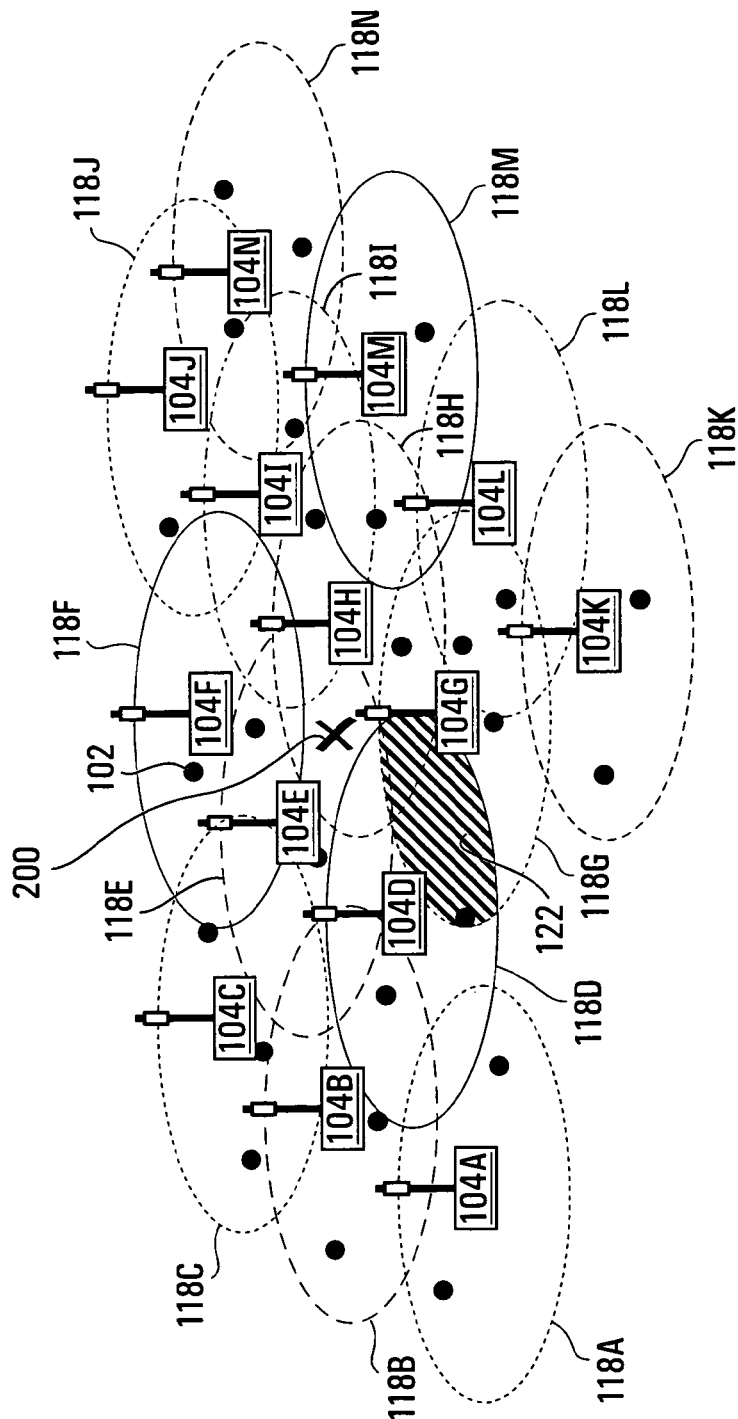
FIG. 2 is a perspective view of a plurality of coverage regions of the cellular architecture as well as the location of occurrence of an event.

With reference to FIGS. 1 and 2, there is shown a cellular architecture for delivering wireless communication services to a plurality of mobile users 102. The wireless communication services can include voice, data and/or multimedia services, and may be delivered using any suitable digital or analog protocol, including but not limited to WiFi, Wi-Max, EV-DO (Evolution Data Only), UMTS (Universal Mobile Telephone Service), GSM (Global System for Mobile Communications), GPRS (Generalized Packet Radio Service), TDMA (Time Division Multiple Access), CDMA (Code Division Multiple Access) and AMPS (Analog Mobile Phone Service). The cellular architecture comprises a plurality of cell sites $104j$ ($A \leq j \leq N$) connected to a backbone network 106 that is managed by a network operator or an enterprise. Although FIG. 1 appears to illustrate the cell sites $104j$ ($A \leq j \leq N$) as outdoor transmission towers, persons skilled in the art will understand that this is not limiting, as the cell sites $104j$ ($A \leq j \leq N$) could just as easily be illustrated by indoor access points of a WiFi (e.g., 802.11) implementation.

It should be appreciated that the present invention is applicable to a public environment (where the mobile users 102 are members of the public and the backbone network 106 is a publicly accessible telecommunications network), a private environment (where the mobile users 102 are members of a group such as emergency personnel and the backbone network 106 can be an emergency communications network), and an enterprise environment (where the mobile users 102 are members of an enterprise and the backbone network 106 is an IT infrastructure operated by the enterprise).

The backbone network 106 comprises a set of mobile switching centers (MSCs) 112 that are operative to route calls to and from the mobile users 102. In some embodiments, the backbone network 106 may be connected via a gateway 108 to the public switched telephone network (PSTN) 110 in order to allow the mobile users 102 not only to place calls to each other, but also to communicate with the rest of the world.

Each of the cell sites $104j$ ($A \leq j \leq N$) is positioned at a specific geographical location and comprises a respective base station controller and a respective antenna subsystem. Each of the cell sites $104j$ ($A \leq j \leq N$) is responsible for communicating with mobile users 102 located in a respective "coverage region". In FIG. 1, the coverage regions are shown as circles surrounding and centered on the respective cell site antenna subsystems. As will be described in greater detail later on, upon occurrence of an event that is deemed sufficiently critical or important, the coverage regions of the various cell sites $104j$ ($A \leq j \leq N$) can be reconfigured (e.g., repositioned, re-sized, reshaped).

It should be understood that various types of events may warrant coverage region reconfiguration, including events that have taken place in the past and events that are expected to take place at a certain time in the future. For example, events that may warrant coverage region reconfiguration include natural or man-made disasters, artistic exhibits, concerts, political rallies, battles and the establishment of humanitarian aid posts or any other event which is likely to trigger a significant increase in communication traffic at or around the event site.

As best seen in the perspective view of FIG. 2, the coverage regions (denoted $118j$ for $A \leq j \leq N$) are portrayed as circular and being of the same size. However, it should be appreciated that the various coverage regions $118j$ ($A \leq j \leq N$) may be of different sizes and/or have more erratic shapes, particularly due to their interaction with physical structures and terrain. As a result, due to certain effects (e.g., reflection, occlusion, etc.) of the geographical landscape, a given one of the cell sites $104j$ ($A \leq j \leq N$) might only be able to communicate with mobile users 102 in an "effective" coverage region that may be differently sized or shaped relative to the aforesaid coverage region. Furthermore, the boundaries of such an "effective" coverage region are not sharply defined since the signals from the corresponding cell site are attenuated nominally by an inverse square law with distance; hence, the coverage region can be viewed as demarcating a boundary where the signal strength has fallen to a specific arbitrary value, beyond which somewhat weaker reception is available. Nevertheless, the reader's understanding of the present invention will not be impaired by assuming that the effective coverage region of a given cell site $104j$ ($A \leq j \leq N$) is the same as its illustrated coverage region $118j$ ($A \leq j \leq N$).

Each cell site $104j$ ($A \leq j \leq N$) is connected to an associated one of the mobile switching centers 112 in the backbone network 106 via a respective communication link $120j$ ($A \leq j \leq N$) that may be wired, wireless and/or fiber optical, for example. A given cell site $104j$ ($A \leq j \leq N$) is configured to receive from its associated one of the mobile switching centers 112 calls that are destined for mobile users 102 in the associated coverage region $118j$ ($A \leq j \leq N$) and to attempt to establish communication with these mobile users 102. In the reverse direction, the given cell site $104j$ ($A \leq j \leq N$) is configured to receive calls from the mobile users 102 in the associated coverage region $118j$ ($A \leq j \leq N$) and to attempt to forward the received calls to the associated one of the mobile switching centers 112 for eventual establishment of communication with a called party, which may or may not be another one of the mobile users 102.

Knowledge of which of the mobile users 102 are located in which of the coverage regions $118j$ ($A \leq j \leq N$) is continually tracked by the cell sites $104j$ ($A \leq j \leq N$) and/or the mobile switching centers 112. Persons skilled in the art will appreciate that the coverage regions $118j$ ($A \leq j \leq N$) of two or more nearby cell sites $104j$ ($A \leq j \leq N$) may overlap to create a corresponding intersection (denoted 122 in the case of coverage region 118D intersecting coverage region 118G), thus allowing mobile users 102 within the intersection (in this case, 122) to be serviced by one or the other of the two or more cell sites (in this case, cell sites 104D and 104G). When this occurs, a given one of the mobile users 102 in the intersection (in this case, 122) may select which of the two or more cell sites (in this case, cell sites 104D and 104G) it will continue to be serviced by. Specifically, the device employed by the given one of the mobile users 102 selects which cell site to attach to, based upon the relative signal strengths of the available cell sites (in this case cell sites 104D and 104G); the device may trigger a change of cell-site association upon the drop in signal strength from one of the cell sites, while the other cell site is providing a stronger or better signal. Alternatively, the two or more cell sites (in this case cell sites 104D and 104G) may decide amongst themselves which one will continue to service the mobile users 102 in the intersection (in this case, 122) and trigger a change of association or force the device to re-associate. Either way, the intersection (in this case denoted 122) represents a region of increased capacity, i.e., where more mobile users 102 can be supported than if there were no such intersection (in this case denoted 122).

The backbone network 106 further comprises a response coordination entity 128 connected to a configuration entity 124 by a communication link 130. The response coordination entity 128, which may be geographically centralized or distributed, has functionality associated with various facets of coordination and management of a response to an event. In the context of the present invention, a relevant part of that functionality is embodied by suitable software, hardware and/or control logic for executing a response coordination process. The response coordination entity 128 is also in communication with various emergency response agencies (e.g., Fire, Police, Ambulance, Hazardous Materials, Army/National Guard, Containment, etc.), which permits efficient planning of an emergency response to the occurrence of critical events.

The response coordination entity 128 receives information regarding occurrence of an event (which can be an event that warrants coverage region reconfiguration or an event that does not warrant coverage region reconfiguration), occurring in the overall geographic area serviced by the cell sites $104j$ ($A \leq j \leq N$). The information regarding occurrence of the event may include a type of the event (possibly also including a time at which it is scheduled to occur—in the case of future events, etc.) as well as a location of the occurrence of the event. The information regarding the event can be provided via 9-1-1 reports or remote sensing equipment. The response coordination entity 128 also has access to policy information regarding the handling of events in the cellular architecture. Based on these inputs, the response coordination entity 128 determines (in an automated, manual or semi-manual way, possibly with the aid of a management console) whether the event warrants coverage region reconfiguration, i.e., whether the cellular architecture is susceptible to experience a sudden and substantial increased demand for wireless services around the event site. In this context, a non-limiting example of policy information includes a policy to determine that the event warrants coverage region reconfiguration if the event elicits more than ten calls to 9-1-1 from within a one-block radius within a single minute. Another factor that may be considered by the policy information and which can influence the determining of whether the event warrants coverage region reconfiguration can be a "criticality" of the event, which can either be determined by the entity that signals occurrence of the event or by the response coordination entity 128 itself based on information received from external entities.

Based on the above, if the event is indeed determined to warrant coverage region reconfiguration, an output of the response coordination process can be a command to reconfigure at least one of the coverage regions $118j$ ($A \leq j \leq N$), accompanied by the location of the event site. These outputs are conveyed to the configuration entity 124.

It should be appreciated that the command to reconfigure at least one of the coverage regions $118j$ ($A \leq j \leq N$) might not actually specify which of those coverage regions needs to be reconfigured, but rather may simply specify that some level of coverage region reconfiguration is required in response to occurrence of the event. A further output of the response coordination process can include action requests and driving directions destined for the various emergency response agencies (e.g., Fire, Police, Ambulance, Hazardous Materials, Army/National Guard, Containment, etc.). Another output of the response coordination process includes enhanced coordination instructions destined for the various emergency response agencies.

It should also be appreciated that the event that was determined to warrant coverage region reconfiguration at some instant in time may, at another instant in time, be determined to no longer warrant coverage region reconfiguration (e.g., once the situation in the vicinity of the event site has stabilized). In that case, the response coordination process being executed by the response coordination entity 128 may detect the cessation of the event and determine that it no longer warrants coverage region reconfiguration. Under such circumstances, the response coordination entity 128 may output a "return to normal" command to the configuration entity 124.

The configuration entity 124 thus receives, depending on the circumstances, a command to reconfigure at least one of the coverage regions 118*j* ($A \leq j \leq N$), accompanied by the location of the event site, or a "return to normal" command. In certain embodiments, it should be appreciated that the response coordination entity 128 and the configuration entity 124 can be co-located or even integrated, in which case the command to reconfigure at least one of the coverage regions 118*j* ($A \leq j \leq N$) and the location of the event site can be internal software variables. The configuration entity 124, which is connected to the various mobile switching centers 112 and/or the various cell sites 104*j* ($A \leq j \leq N$), comprises suitable software, hardware and/or control logic for executing a configuration process. The configuration process takes into account the inputs received from the response coordination entity 128, as well as position information regarding the cell sites coverage regions 104*j* ($A \leq j \leq N$). In an automated, manual, or semi-manual way (possibly with the aid of a management console), the configuration entity 124 produces an individual adjustment to the respective coverage region of at least one of the cell sites 104*j* ($A \leq j \leq N$).

The individual adjustments can take the form of an adjustment to the size and/or shape and/or position of the coverage regions 118*j* ($A \leq j \leq N$) associated with the various cell sites 104*j* ($A \leq j \leq N$). In one specific non-limiting embodiment, as part of the configuration process, the configuration entity 124 determines the new size/shape/position for each affected cell site (based on the geographic position of the cell in question) and determines what the antenna response characteristics for individual cell site should be (based on the type of antenna being used) in order to achieve the new size/shape/location. The configuration entity 124 then sends these newly derived antenna response characteristics to each affected cell site via the appropriate MSC 112. The affected cell sites then apply the new antenna response characteristics accordingly. It should be appreciated that it may be advantageous for the configuration entity 124 to know what the antenna response characteristics were initially configured as, in order to be able to revert to these initial antenna response characteristics once the event has passed and a "return to normal" command is received from the response coordination entity 128.

In another specific non-limiting embodiment, as part of the configuration process, the configuration entity 124 determines the new size/shape/position for each affected cell site (based on the geographic position of the cell in question). However, the configuration entity 124 does not determine the antenna response characteristics. Rather, the configuration entity 124 issues a command to each affected cell via site the appropriate MSC 112, such command specifying the new size/shape/position that the coverage region for the cell site in question needs to acquire. Upon receipt of this command, an affected cell site determines what the antenna response characteristics of its antenna should be (based on the type of antenna being used), and then applies these new antenna response characteristics. In this embodiment, it would be advantageous for the individual cell sites to know what their antenna response characteristics were initially configured as, in order to be able to revert to them once the even has passed and when the configuration entity 124 indicates that the respective coverage regions are to assume their original size/shape/position.

Figure 3:
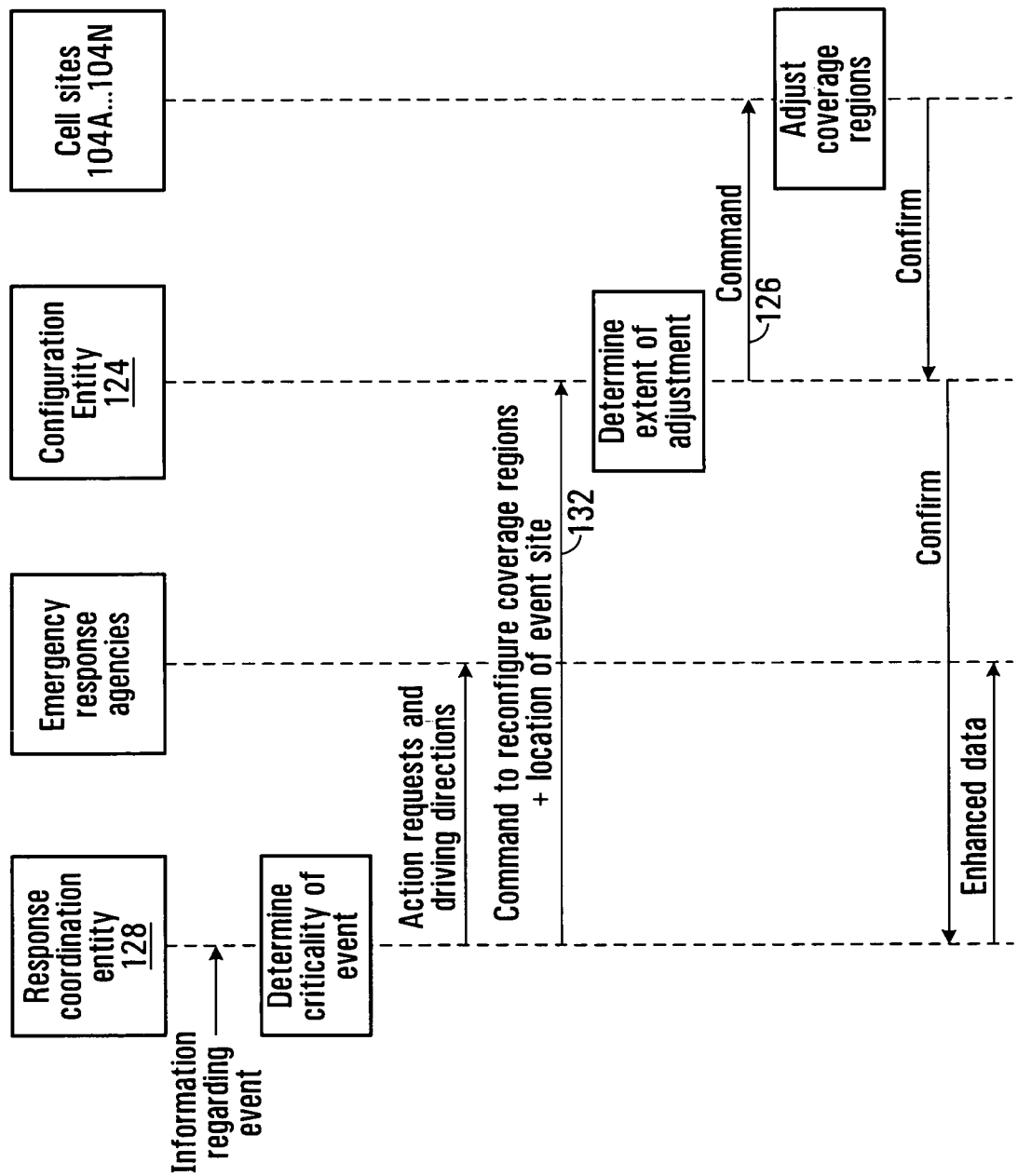
FIG. 3 is a message flow diagram representing actions taken by various entities in the cellular architecture in response to detection of the event and, particularly, where the event is determined to warrant coverage region reconfiguration.

Turning now to FIGS. 2 and 3, it is assumed now that an event has occurred at a location denoted by the numeral 200 (hereinafter referred to as the "event site") and that the event is sufficiently critical/important that it warrants coverage region reconfiguration, i.e., the cellular architecture is susceptible of experiencing a sudden and substantial increased demand for wireless services in a vicinity of the event site 200. Information regarding the type and location of occurrence of the event may be communicated to the response coordination entity 128 by way of a 9-1-1 report or using remote sensors that detect occurrence of the event. As part of the response coordination process, and based on the information regarding the event and the policy information, and amongst all other actions it has to undertake, the response coordination entity 128 determines in this case that the event does warrant coverage region reconfiguration, i.e., the cellular architecture is deemed susceptible of experiencing a sudden and substantial increased demand for wireless services in the vicinity of the event site 200. Although in the illustrated embodiment the event site 200 appears within coverage regions 118E and 118H that are serviced by cell sites 104E and 104H, respectively, persons skilled in the art will appreciate that the event site 200 may appear within a single one of the coverage regions 118*j* ($A \leq j \leq N$) or within an intersection of two or more coverage regions 118*j* ($A \leq j \leq N$). Alternatively, the event site 200 may appear outside any of the coverage regions 118*j* ($A \leq j \leq N$).

In addition, the emergency coordination entity 128 sends action requests and driving directions to the emergency response agencies (e.g., Fire, Police, Ambulance, Hazardous Materials, Army/National Guard, Containment, etc.) in order to cause the appropriate resources to be dispatched. Still continuing with the response coordination process, the emergency coordination entity 128 formulates a command to reconfigure at least one of the coverage regions 118*j* ($A \leq j \leq N$), accompanied by the location of the event site 200. This information is conveyed to the configuration entity 124 in the form of a command 132.

At the configuration entity 124, and as part of the configuration process, the configuration entity 124 interprets the command 132 and determines an extent and direction to which the coverage regions 118*j* ($A \leq j \leq N$) of the cell sites 104*j* ($A \leq j \leq N$) need to be adjusted. This can be computed based on reshaping algorithm which, in a non-limiting example embodiment, determines the extent and direction to which the coverage region 118*j* ($A \leq j \leq N$) of a given cell site 104*j* ($A \leq j \leq N$) needs to be adjusted based on the location of the given cell site 104*j* ($A \leq j \leq N$) relative to the location of the event site 200. In accordance with a simple non-limiting example embodiment, the adjustment of the coverage region 118*j* ($A \leq j \leq N$) of the given cell site 104*j* ($A \leq j \leq N$) may, under certain circumstances, correspond to a translation by a distance that is inversely proportional to the distance between the event site 200 and the given cell site 104j (A≦j≦N) and which is in a direction towards the event site 200. Generally, however, the extent to which a particular coverage region 118j (A≦j≦N) needs to be adjusted can define a change in size and/or shape and/or position of the particular coverage region 118j (A≦j≦N). Moreover, the adjustment to the size and/or shape and/or position of the particular coverage region 118j (A≦j≦N) can be different from one coverage region 118j (A≦j≦N) to the next.

Furthermore, in addition to being responsive to the command 132 in order to provide enhanced coverage in a vicinity of the event site 200, the configuration entity 124 can also be responsive to knowledge of the characteristics of the cellular architecture that is being configured. For instance, the configuration entity 124 may step through a process of identifying the direction and magnitude of coverage region shift required for an optimum response to the command 132 from the response coordination entity 128, then may generate a new cell boundary map (a map which shows the projected extent of the coverage regions for each of the cell sites) and assess this map, based upon knowledge of the carrier frequency or carrier frequencies allocated to each cell site, to determine whether any two or more cell sites using the same carrier frequency now overlap. If this is the case, then the configuration entity 124 computes by how much the offending cell sites have to be backed off from being moved in order not to avoid this situation, thereby to avoid "common channel interference" (which causes the effect whereby, despite strong radio signals being present, no communication occurs).

Moreover, the configuration entity 124 may consider additional factors when executing the configuration process. In particular, such additional factors may include a peak expected traffic in the vicinity of the event site 200 and a current traffic load of the various cell sites 104j (A≦j≦N). In various non-limiting embodiments, the expected peak demand may represent a maximum number of simultaneous active calls, a maximum number of simultaneous active calls including overhead for call handoff to adjacent cell sites, a maximum number of active users, a maximum number of active sessions and a maximum number of packets per second, or a combination thereof.

Continuing with the configuration process, the configuration entity 124 generates a command 126 destined for various ones (but not necessarily all) of the cell sites 104j (A≦j≦N). The command 126 destined for a given one of the cell sites 104j (A≦j≦N) specifies the aforesaid adjustment to the size and/or shape and/or position of the associated one of the coverage regions 118j (A≦j≦N), based upon the computational results applicable to that cell site, as generated by the configuration process. In another embodiment, the command 126 sent to a given one of the cell sites 104j (A≦j≦N) may include new antenna response characteristics for the antenna subsystem at the cell site in question.

In response to receipt of the command 126 destined for itself, each of the cell sites 104j (A≦j≦N) proceeds to adjust the size and/or shape and/or position of its respective coverage region 118j (A≦j≦N) according to the specified adjustment. This can be achieved using a variety of techniques, as now described with reference to FIG. 7A, which shows a plan view of a specific cell site having a base station controller 702 and an antenna subsystem 704. For the purposes of the present example, which is not to be considered limiting, the antenna subsystem 704 has six (6) antenna segments 704A . . . F. Each of the segments 704A . . . F provides a respective coverage sub-region 706A . . . F, each of which, in a quiescent state, is a circle or parabolic ellipse of equal size. The coverage sub-regions 706A . . . F together describe a coverage region 708A for the cell site. For simplicity and convenience, the coverage region 708A has also been modeled as a circle rather but could have been modeled as a hexagon or a more complex shape. Of course, the number of antenna segments 704A . . . F may differ from six (6), and the coverage sub-regions 706A . . . F in their quiescent state may each be different from a circle, without departing from the spirit of the invention.

Each of the antenna segments 704A . . . F of the antenna subsystem 704 operates in a transmit direction and a receive direction. In the transmit direction, the antenna segments 704A . . . F can be programmable, beam-formed elements or fixed, static-design antennas fed by an adjustable power level. In the receive direction, the antenna segments 704A . . . F can be fed from adaptive beam-formed antenna elements. Alternatively, a rotatable directional antenna can be used or other beam-forming or programmable gain/directivity antenna structures can be used. The antenna subsystem 704 can also be provided with an ultra-low-noise receiver that can be associated with a selected one of the antenna segments 704A . . . F when needed, or a roatatable directional antenna with higher antenna gain can be used with an additional receiver.

Assume now that the event site 200 lies in a direction generally indicated by an arrow 750. It is recalled that in this specific non-limiting embodiment, the command 126 destined for the base station controller 702 responsible for the antenna subsystem 704 specifies an adjustment to the size and/or shape and/or position of the coverage region 708A. The base station controller 702 converts this adjustment into an amount by which to adjust the response characteristics of the antenna segments 704A . . . F. (In an alternative embodiment, this conversion can be effected by the configuration entity 124.) FIGS. 7B and 7C show the result of adjusting the response characteristics of the antenna segments 704A . . . F based on the command 126, in two non-limiting embodiments of the present invention.

Specifically, in FIG. 7B, a beam-forming approach is used, which causes each of the sub-regions 706A . . . F to be warped (i.e., bent out of their original circular shape). The consequence is movement of the coverage region 708A towards the event site 200 (i.e., along the direction of the arrow 750), resulting in a post-reconfiguration coverage region 708B. In FIG. 7C, a power level approach is used, which causes the sub-regions 706A . . . F to retain their original circular shapes and hence antenna gain/directivity properties, but modifies their individual driven power levels and hence launched power levels, thus changing their relative diameters, which represents the distance at which their transmission signals fall to a specific field strength. Again, the consequence is movement of the coverage region 708A towards the event site 200 (i.e., along the direction of the arrow 750), resulting in a post-reconfiguration coverage region 708C.

Persons skilled in the art will appreciate that although the coverage region 708A is shown as retaining its generally circular shape after adjustment of the antenna response characteristics (708B, 708C), it is nevertheless within the scope of the present invention to cause the coverage region 708A to acquire a different shape due to adjustment of the antenna response characteristics. Also, persons skilled in the art will appreciate that techniques other than beam-forming and power level variation can be used to adjust the response characteristics of the antenna segments 704A . . . F without departing from the spirit of the present invention.

Returning to FIG. 3, once the various cell sites 104j ($A \leq j \leq N$) have adjusted the size and/or shape and/or position of their associated coverage regions 118j ($A \leq j \leq N$), the cell sites 104j return a confirmation of adjustment to the configuration entity 124. In turn, the configuration entity 124 returns a message to the response coordination entity 128, confirming that the command to reconfigure the coverage regions 118j ($A \leq j \leq N$) has been successfully carried out. In response, the response coordination entity 128 may issue further enhanced data to the emergency response agencies or may inform them of the availability of enhanced capabilities.

Figure 4A:
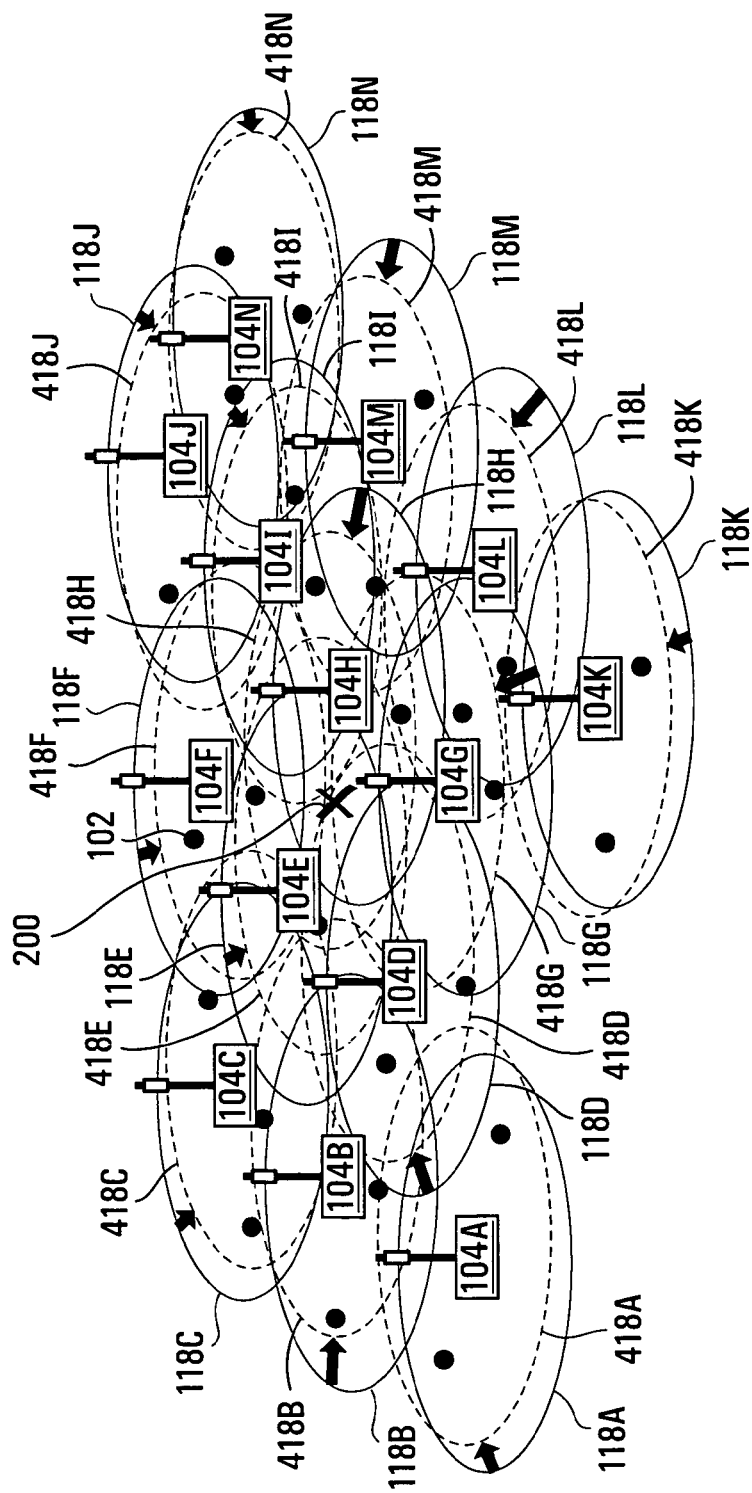
FIG. 4A is a perspective view of the coverage regions of FIG. 2 before and after being reconfigured in response to detection of the event.
Figures 4B, 4C:
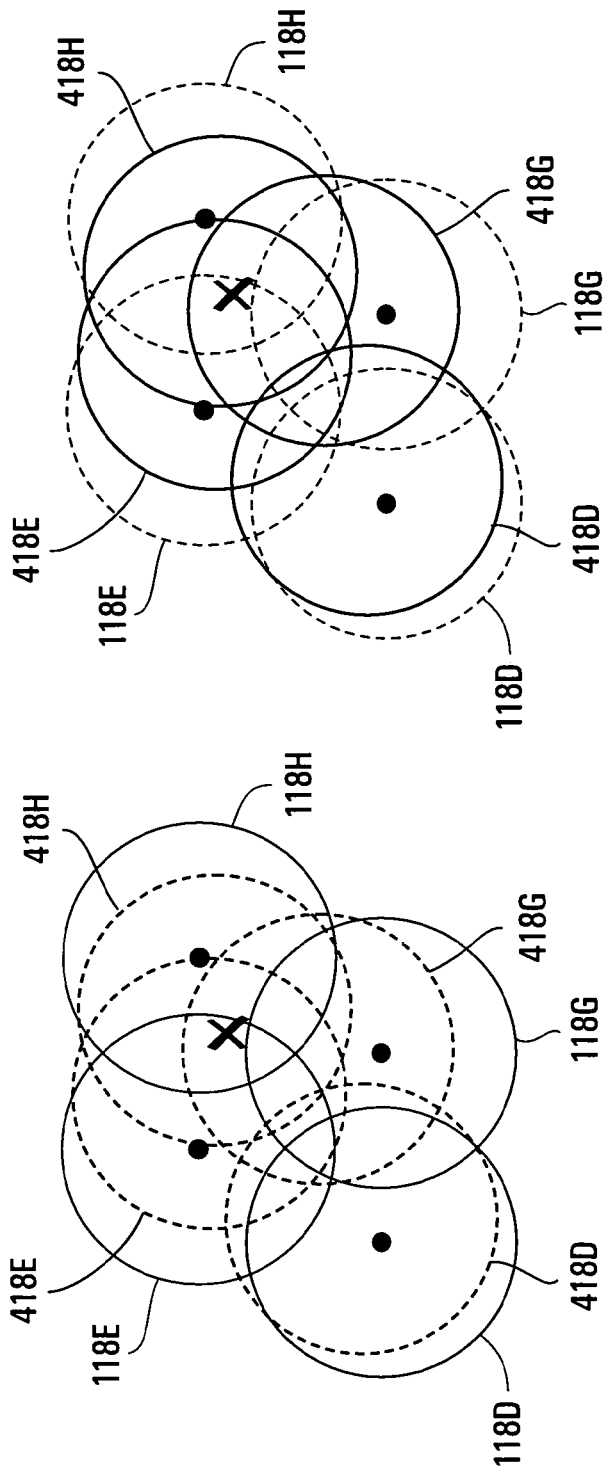
FIG. 4B is a plan view that shows, in solid outline, a subset of the coverage regions of FIG. 2 prior to being reconfigured in response to detection of the event, and, in dashed outline, the same subset of coverage regions after being reconfigured in response to detection of the event.
FIG. 4C is similar to FIG. 4B, except that the pre-configuration situation is shown in dashed outline and the post-configuration situation is shown in solid outline.

A non-limiting example of enhanced data includes and authorization to transmit multimedia content to and from mobile users 102 in the vicinity of the event site 200. Enhanced capabilities can refer to a service type (such as imaging to complement voice communications) that would otherwise not be supportable on the underlying emergency network. The enhanced data may be of the form "you can now send video or still images of what you are seeing" to emergency response personnel on the ground, to allow them to better show the response coordination entity 128 what is happening at the event site 200, or may be used to send real-time telemetry to team leaders or team members in the field, for instance warning them of approaching hazards or changing conditions they may not be aware of. With reference now to FIGS. 4A-4C, there is shown in perspective view the effect of reconfiguring the coverage regions region 118j ($A \leq j \leq N$) in response to occurrence of an event considered to warrant coverage region reconfiguration, according to a specific non-limiting example embodiment of the present invention. Specifically, the coverage region 118j ($A \leq j \leq N$) of each of the cell sites 104j ($A \leq j \leq N$) after adjustment of the antenna response characteristics is hereinafter referred to as a "post-reconfiguration" coverage region and denoted 418j ($A \leq j \leq N$). It is seen in this specific case that the post-reconfiguration coverage regions 418j ($A \leq j \leq N$) are shifted versions of the coverage regions 118j ($A \leq j \leq N$), and which have moved towards the event site 200. Moreover, those of the post-reconfiguration coverage regions 418j ($A \leq j \leq N$) associated with cell sites 104j ($A \leq j \leq N$) that are closer to event site 200 have moved more than those of the post-reconfiguration coverage regions 418j ($A \leq j \leq N$) associated with cell sites 104j ($A \leq j \leq N$) that are further from the event site 200. It should be appreciated that in certain other embodiments of the present invention, it is possible to cause one or more of the post-reconfiguration coverage regions 418j ($A \leq j \leq N$) to acquire a shape that differs from that of the corresponding coverage region 118j ($A \leq j \leq N$), e.g., the post-reconfiguration coverage regions can be reshaped from circular to oval structures.

Reconfiguration of the coverage regions 118j ($A \leq j \leq N$) in the above manner, resulting in the post-reconfiguration coverage regions 418j ($A \leq j \leq N$) shown in FIGS. 4A-4C, may have multiple effects on the ability to provide wireless service to the mobile users 102 in the overall geographic area serviced by the cell sites 104j ($A \leq j \leq N$). Specifically, with reference to FIG. 5A, there is shown a subset of the overall geographic area in the vicinity of the event site 200. In particular, FIG. 5A illustrates coverage regions 118D, 118E, 118G and 118H. In the present example, the event site 200 falls within both coverage region 118E and coverage region 118H. This means that wireless service is available to mobile users 102 at the location of the event site 200 prior to occurrence of the event. However, it should be understood that the event site 200 may only fall into one coverage region or in fact may not fall into any of the coverage regions 118j ($A \leq j \leq N$).

Shown in FIG. 5B are post-reconfiguration coverage regions 418D, 418E, 418G and 418H, which correspond to the coverage regions 118D, 118E, 118G and 118H, respectively. It is noted that, as described above, the post-reconfiguration coverage regions 418D, 418E, 418G, 418H are translated versions of the corresponding coverage regions 118D, 118E, 118G, 118H, where the amount of movement towards the event site 200 has been determined by the configuration process executed by the configuration entity 124. In a non-limiting example embodiment, the amount of movement towards the event site 200 can be a function of the distance between the corresponding cell site 104D, 104E, 104G, 104H and the location of the event site 200, although this need not be the case in general. In a specific example, not to be considered limiting, the amount of movement of a particular coverage region towards the event site 200 can be inversely proportional to the distance between the corresponding cell site (assumed to be at the center of the particular coverage region) and the location of the event site 200, provided this distance exceeds a certain threshold. Below this threshold, the amount of movement of a particular coverage region towards the event site 200 can be that required to place the effective center of the particular coverage region at the event site 200 in a post-reconfiguration scenario. In this way, coverage regions that are very close to the event site 200 may not need to be moved very much (especially if their center coincides with the event site 200), while merely proximate coverage regions will need to be moved significantly and still further coverage regions will need to be moved correspondingly less.

Figure 5D:
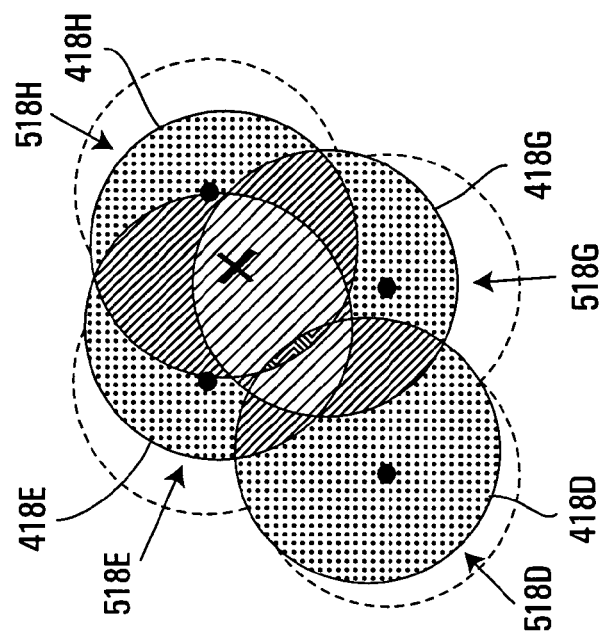
FIG. 5D is similar to FIG. 5B, except that it breaks down the agglomerated post-reconfiguration coverage region into sub-areas according to the number of cell sites covering that sub-area.

Specifically, with reference to FIGS. 5A, 5B, 5C, 5D, there is shown a subset of the overall geographic area in the vicinity of the event that was determined to warrant coverage region reconfiguration. In particular FIG. 5A shows coverage regions 118D, 118E, 118G and 118H as they existed in the quiescent (i.e., pre-reconfiguration) scenario. In this particular example, it is noted that the event occurs at a location within coverage regions 118E, 118H, while being just outside of coverage region 118G and outside of coverage region 118D. This means that wireless service is available to mobile users 102 at the event site 200 prior to the occurrence of the event. However, it should be understood that the event site 200 may fall into only a single coverage region or into more than two coverage regions or may even be just outside of any coverage region 118j ($A \leq j \leq N$), especially at the edge of a cellular network.

With continued reference to FIG. 5A, the four coverage regions form a "agglomerated coverage region" where they share the total task of providing wireless service, either individually or in combination, with some sub-areas of a given coverage region being fed from a single cell site, while other sub-areas being covered by two or even three cell sites. Within the agglomerated coverage region are pre-existing mobile users (i.e., mobile users who are active before occurrence of the event) and which represent a background load on the traffic capacity of the cellular architecture. The pre-existing mobile users will be distributed across the agglomerated coverage region in some arbitrary manner which may approach uniformity, randomness or macro-uniformity through randomness, or which may have some kind of structure.

For the purpose of this non-limiting example description, a micro-random distribution giving an approximately uniform macro-level distribution will be assumed. Such an arrangement would imply that the number of potential pre-existing mobile users who are provided service across the agglomerated coverage region formed by the union of coverage regions 118D, 118E, 118G and 118H will be a function of the size, specifically the area, of this agglomerated coverage region. In the case of a uniform distribution of mobile users, the number of pre-existing mobile users will be proportional to the surface area of the agglomerated coverage region and therefore a smaller agglomerated coverage region would result in a proportionally smaller number of pre-existing mobile users in the agglomerated coverage region. In more irregular distributions of pre-existing mobile users this simple linear relationship is not accurate, although in general, smaller agglomerated coverage regions tend to allow provide wireless service to fewer pre-existing mobile users.

FIG. 5B shows post-reconfiguration coverage regions 418D, 418E, 418G and 418H, which correspond to the coverage regions 118D, 118E, 118G and 118H, respectively. It is noted that, as described above, the post-reconfiguration coverage regions 418D, 418E, 418G, 418H are translated versions of the corresponding coverage regions 118D, 118E, 118G, 118H, where the amount of movement towards the event site 200 has been determined by the configuration process executed by the configuration entity 124. In a non-limiting example embodiment, the amount of movement towards the event site 200 is inversely proportional to the distance between the corresponding cell site 104D, 104E, 104G, 104H and the location of the event site 200, although this need not be the case in general. In a specific example, not to be considered limiting, the amount of movement of a particular coverage region towards the event site 200 can be inversely proportional to the distance between the corresponding cell site (assumed to be at the center of the particular coverage region) and the location of the event site 200, provided this distance exceeds a certain threshold. Below this threshold, the amount of movement of a particular coverage region towards the event site 200 can be that required to place the effective center of the particular coverage region at the event site 200 in a post-reconfiguration scenario. In this way, coverage regions that are very close to the event site 200 may not need to be moved very much (especially if their center coincides with the event site 200), while merely proximate coverage regions will need to be moved significantly and still further coverage regions will need to be moved correspondingly less.

Considering now FIG. 5B, following the coverage region reconfiguration in response to determining that the event warrants coverage region reconfiguration, it can be seen that the agglomerated post-reconfiguration coverage region, which is formed by the union of the post-reconfiguration coverage regions 418D, 418E, 418G and 418H, is now smaller in total area than the agglomerated coverage region formed by the union of the coverage regions 118D, 118E, 118G and 118H in FIG. 5A. Thus, although the surface area of an individual coverage region may not have changed between, say coverage region 118D and post-reconfiguration coverage region 418D, its epicenter will have been shifted towards the event site 200. As a result, a number of sub-areas exist that were served by coverage regions 118D, 118E, 118G, 118H and which are no longer served by post-reconfiguration coverage regions 418D, 418E, 418G and 418H, such areas being indicated in FIG. 5B as 518D, E, G and H. The exclusion of sub-areas 518D, 518E, 518G and 518H from the agglomerated post-reconfiguration coverage region results in the pre-existing mobile users contained therein being dropped from their formerly associated cell sites, resulting in a lower background traffic in the agglomerated post-reconfiguration coverage region, thereby creating more spare capacity that can be allocated in the vicinity of the event site 200. The pre-existing mobile users from coverage regions 118D, 118E, 118G and 118H no longer served by cell sites 118D, 118E, 118G and 118H are now served by adjacent cell sites that are themselves shifted towards the event site 200 as was shown in FIG. 2.

These adjacent cell sites are shifted by a somewhat lesser amount, so the overall effect is to slightly increase the "effective" cell site spacing and that of their respective coverage regions. Hence, a minor degradation of system margin across the cellular architecture is the price to pay for a much higher coverage, traffic capacity and margin in the vicinity of the event site 200.

Figure 5C:
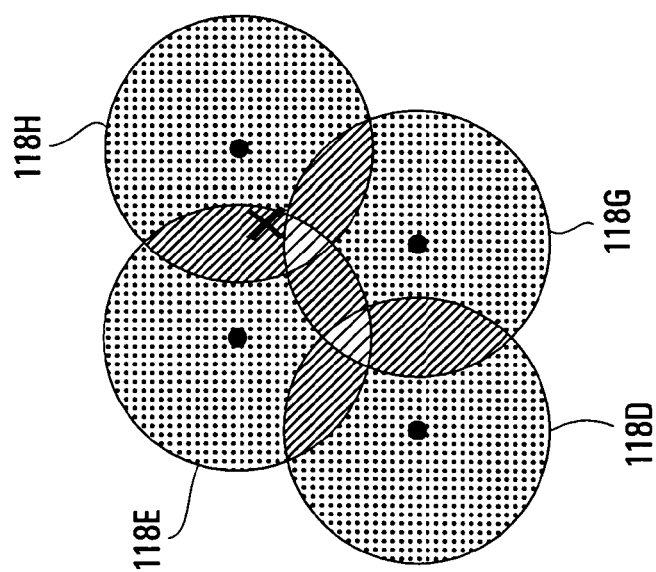
FIG. 5C is similar to FIG. 5A, except that it breaks down the agglomerated coverage region into sub-areas according to the number of cell sites covering that sub-area.

Comparing now FIG. 5A with FIG. 5B, FIG. 5C with FIG. 5D, an additional effect of coverage region reconfiguration is also noticeable. That is, by shifting the coverage regions towards the event site 200, the total surface area at and in the vicinity of the event site 200 that can be served by more than one cell site has been increased, providing increased service diversity, load sharing and traffic sharing between cell sites in the vicinity of the event site 200.

By further examination of FIGS. 5C and 5D, it can be discerned that, in the vicinity of the event site 200, the number of cells usable at any given location in this vicinity has increased. This allows for the additional traffic capacity of multiple cell sites to be deployed across the entire vicinity of the event site 200, irrespective of where within the vicinity of the event site 200 the actual peak traffic demand may occur. For instance, a local emergency response center that is set up near the event site 200—but not necessarily coincident in location with it—may be where a substantive increase in traffic demand occurs.

Figure 6A:
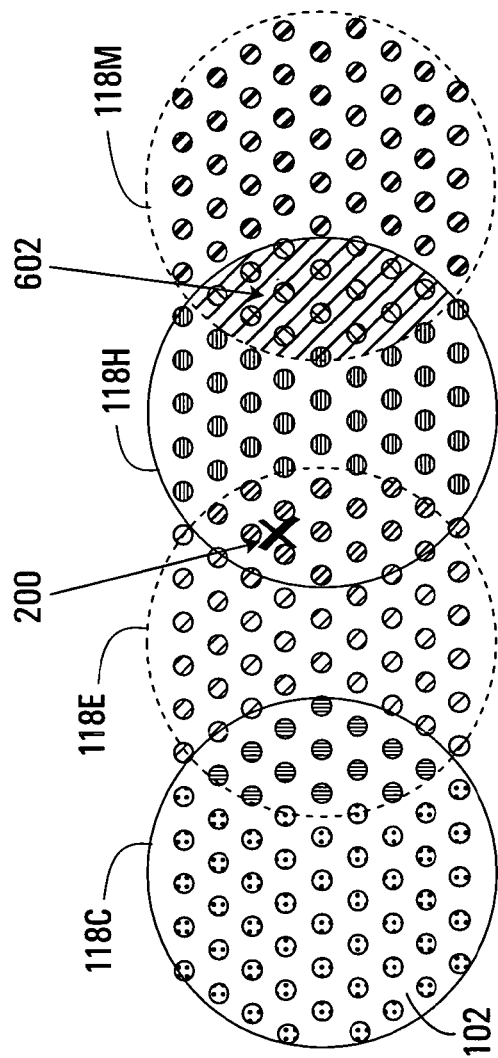
FIG. 6A is a plan view of a subset of the coverage regions of FIG. 2, illustrating the coverage by the corresponding cell sites of mobile users in the cellular architecture of FIG. 1 prior to coverage region reconfiguration.

How the reduction in surface area (i.e., compaction) of the agglomerated coverage region around the event site 200 affects mobile users 102 currently being serviced by the cell sites $104j$ ($A \leq j \leq N$) is now described with reference to FIGS. 6A-6D. Specifically, FIG. 6A shows a plan view of coverage regions 118C, 118E, 118H, 118M, as well as the event site 200. As can be appreciated, there exist intersections between two coverage regions. For example, the intersection between coverage regions 118H and 118M correspond to a geographic area that is serviced by cell sites 104H and 104M (i.e., where wireless services can be provided via cell site 104H or cell site 104M) before occurrence of the event at the event site 200. Which of the two cell sites 104H, 104M is actually used to provide the wireless services to mobile users 102 located in this intersection can be determined by the mobile users 102 themselves or by the cell sites 104H and 104M (or by the mobile switching centers 112). Assuming that half of the mobile users 102 located in this intersection are serviced by cell site 104H and the other half by cell site 104M, and applying the same rule to the intersection between coverage regions 118C and 118E and the intersection between coverage regions 118E and 118H, one will observe from the example of FIG. 6A and the table in Fig. B that the average load on cell sites 104C, 104E, 104H and 104M in the quiescent scenario is as follows:

| Cell site | Quiescent<br>Average number of<br>mobile users 102<br>serviced |
|---|---|
| 104C | 53.5 |
| 104E | 50.5 |
| 104H | 47 |
| 104M | 52 |
| Total | 203 |

Figure 6C:
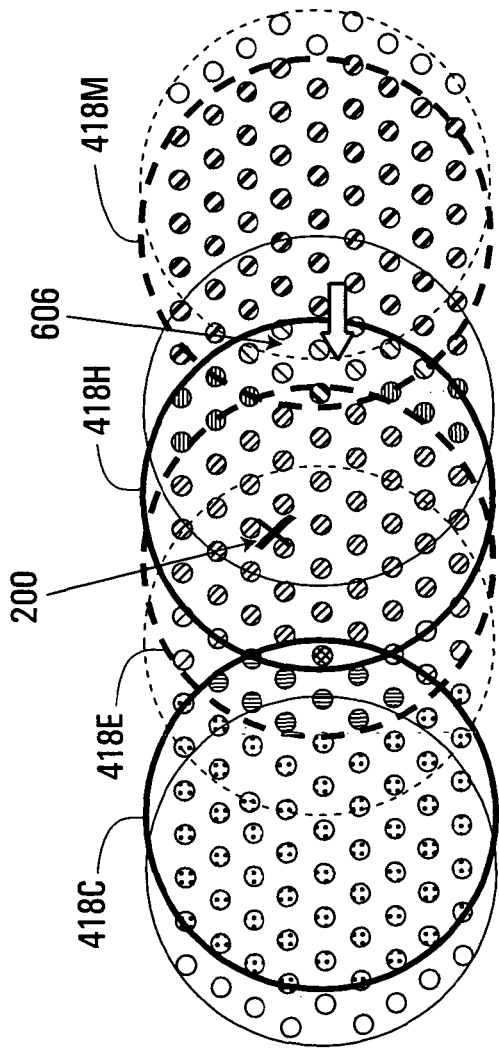
FIG. 6C is a plan view of the same subset of the coverage regions as in FIG. 6A, but in a post-reconfiguration scenario.

FIG. 6C shows the post-reconfiguration scenario, namely the post-reconfiguration coverage regions 418C, 418E, 418H, 418M corresponding to the coverage regions 118C, 118E, 118H, 118M, respectively. As described above, the post-reconfiguration coverage regions 418C, 418E, 418H, 418M are translated versions of the coverage regions 118C, 118E, 118H, 118M that have been moved towards the event site 200. As can be appreciated, there exist intersections between two coverage regions (i.e., where the load is assumed to be split in half), as well as intersections between three coverage regions (i.e., where the load is assumed to be split in three). As such, one will observe from the example of FIG. 6C and the table in FIG. 6D that the average load on cell sites 104C, 104E, 104H and 104M in a post-reconfiguration scenario is as follows:

| | Post-reconfiguration |
|---|---|
| Cell site | Average number of mobile users 102 serviced |
| 104C | 58.83 |
| 104E | 33.67 |
| 104H | 34.67 |
| 104M | 58.83 |
| Total | 186 |

One observation from the above example is that cell sites 104E and 104H closest to the event site 200 service fewer existing mobile users 102 in the post-reconfiguration scenario than in the quiescent scenario. Specifically, cell site 104E services an average of 33.67 pre-existing mobile users instead of 50.5, while cell site 104H services an average of 34.67 pre-existing mobile users instead of 47. This translates into an increased capacity to service additional (new) mobile users 102 in the post-reconfiguration coverage regions 418E, 418H, or to increase the data transmission rate for pre-existing mobile users in this intersection. Advantageously, in the event of a disaster, the increased capacity can be used to handle calls of an emergency nature that could not be completed without compaction of coverage regions 118C, 118E, 118H, 118M around the event site 200.

Another observation from the above example is that certain mobile users 102 formerly located in the intersection of coverage regions 118H and 118M (and therefore just as likely to be serviced by cell site 104H as by cells site 104M in the quiescent scenario) are not located in the intersection of post-reconfiguration coverage regions 418H and 418M. These mobile users 102 are now serviced exclusively by cell site 104M. Thus, if any of these mobile users 102 had been serviced by cell site 104H, then they would be handed off to cell site 104M. This can be referred to as a forced handoff.

Figure 8A:
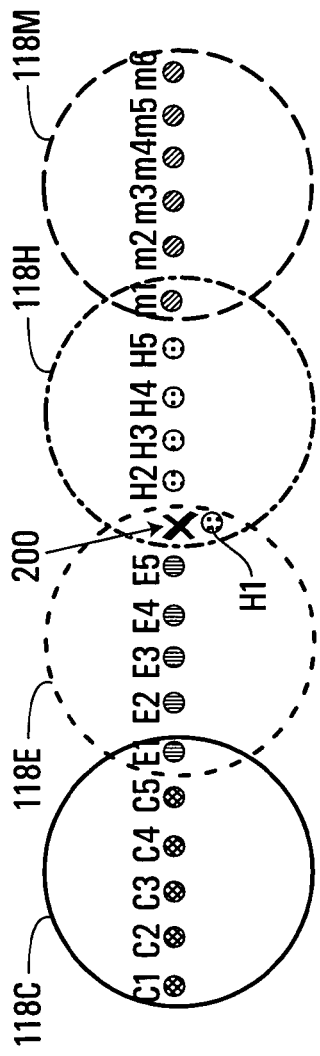
FIGS. 8A-8C are a plan view of a subset of the coverage regions of FIG. 4A-4C, illustrating the effect of exaggerated compaction on mobile users already being serviced by the cellular architecture.

In fact, it is within the scope of the present invention to exaggerate compaction of the coverage regions around the event site 200, thereby bringing the precipitous onset of forced handoff. For example, FIG. 8A shows a plan view of coverage regions 118C, 118E, 118H, 118M. Assuming that a mobile user located in an intersection of two coverage regions is serviced with equal probability by either corresponding cell site (with the "rightmost" cell site one taking over in the case of an odd number of mobile users), one will have the following association between each of the mobile users and the cell site that services it:

| Cell site | Mobile users serviced (quiescent) | Number of mobile users serviced |
|---|---|---|
| 104C | C1, C2, C3, C4, C5 | 5 |
| 104E | E1, E2, E3, E4, E5 | 5 |
| 104H | H1, H2, H3, H4, H5 | 5 |
| 104M | M1, M2, M3, M4, M5, M6 | 6 |

Figure 8B:
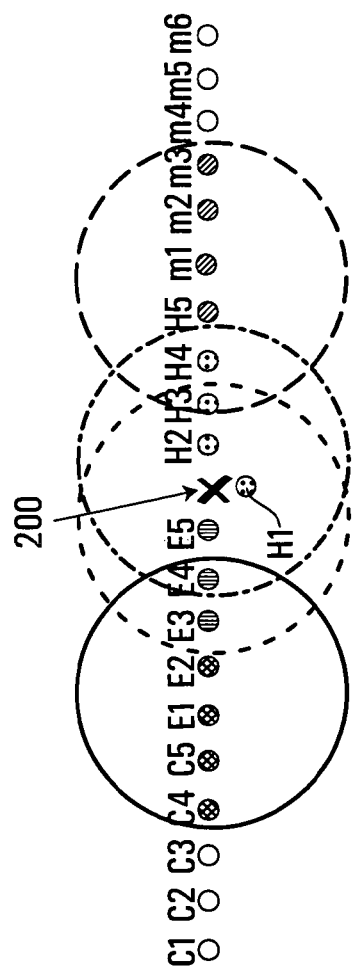

FIG. 8B shows the exaggerated scenario, namely exaggerated post-reconfiguration coverage regions 818C, 818E, 818H, 818M corresponding to the coverage regions 118C, 118E, 118H, 118M, respectively. It will be noted that the exaggerated post-reconfiguration coverage regions 818C, 818E, 818H, 818M are the result of a over-compaction of the post-reconfiguration coverage regions 418C, 418E, 418H, 418M around the event site 200. Assuming that a mobile user already serviced by a given cell site continues, where possible, to be serviced by that cell site, one will have the following association between each of the mobile users and the cell site that services it:

| Cell site | Mobile users serviced (exaggerated scenario) | Number of mobile users serviced |
|---|---|---|
| 104C | C4, C5, E1, E2 | 4 |
| 104E | E3, E4, E5 | 3 |
| 104H | H1, H2, H3, H4 | 4 |
| 104M | H5, M1, M2, M3 | 4 |

Figure 8C:
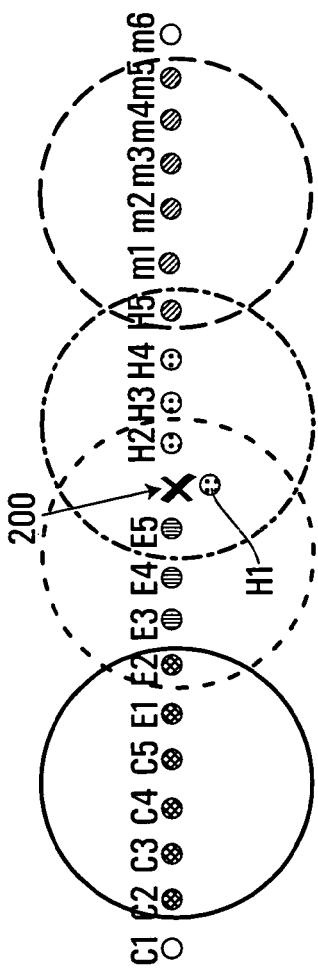

FIG. 8C shows the previously described post-reconfiguration scenario, namely post-reconfiguration coverage regions 418C, 418E, 418H, 418M corresponding to the coverage regions 118C, 118E, 118H, 118M, respectively. It will be noted that the post-reconfiguration coverage regions 418C, 418E, 418H, 418M are the result of a slight de-compaction of the exaggerated post-reconfiguration coverage regions 818C, 818E, 818H, 818M around the event site 200. Assuming that a mobile user already serviced by a given cell site continues, where possible, to be serviced by that cell site, one will have the following association between each of the mobile users and the cell site that services it:

| Cell site | Mobile users serviced (post-reconfiguration scenario) | Number of mobile users serviced |
|---|---|---|
| 104C | C2, C3, C4, C5, E1, E2 | 6 |
| 104E | E3, E4, E5 | 3 |
| 104H | H1, H2, H3, H4 | 4 |
| 104L | H5, M1, M2, M3, M4, M5 | 6 |

Thus, it is seen that mobile user E2 (which had initially been serviced by cell site 104E) is now serviced by cell site 104C, whereas if the amount of compaction had not been exaggerated, mobile user E2 would still be serviced by cell site 104E. Similarly, mobile user H5 (which had initially been serviced by cell site 104H) is now serviced by cell site 104L, whereas if the amount of compaction had not been exaggerated, mobile user H5 would still be serviced by cell site 104H. Consequently, by over-compaction, certain mobile users are forcibly migrated from the inner cell sites (in this case, cell sites 104E and 104H) to the outer cell sites (in this case, cell sites 104C and 104M), thus liberating even more capacity for the inner cell sites once the over-compaction is relaxed and the compaction reaches the desired level.

Another observation from the above example is that the two outermost mobile users 102 (i.e., C1 and M6) that used to fall within coverage regions 118C and 118M do not fall within either coverage region 418C or 418M, which means that if there is no other cell site at the outskirts of post-reconfiguration coverage regions 418C and 418M, mobile users C1 and M6 will be dropped. Generally speaking, compaction of the coverage regions 118j (A≦j≦N) around the event site 200 results in a finite probability that mobile users 102 that are remote relative to the event site 200 will be dropped.

Another observation from the above example is that the outer cell sites (in this case, cell sites 104C and 104M) service a greater number of mobile users in the post-reconfiguration scenario than in the quiescent scenario. Thus, additional capacity may need to be available in order to minimize the impact on the mobile users 102; this additional capacity can be built into the design of the cellular architecture in the form of a design margin.

Persons skilled in the art will appreciate that for simplicity and convenience, a linear arrangement of coverage regions 118C, 118E, 118H, 118M has been used to illustrate certain features of a specific embodiment of the present invention. In other instances, (for example, where hexagonal cells are used, where the coverage regions span multiple floors of a building, etc.), it should be appreciated that the effects observed along one axis may be replicated over a plurality of axes, thereby enhancing the overall effect of compaction.

It will also be apparent that the ability to compact the coverage regions 118j (A≦j≦N) around a given event site mitigates the consequences of equipment failure at a given one of the cell sites 104j (A≦j≦N). Under such circumstances, the vicinity of the given event site will occupies a region that corresponds to the coverage region of the given one of the cell sites 104j (A≦j≦N).

Thus, it will be appreciated that the above teachings provide methods and systems for increasing the capacity of a wireless communications system in the vicinity of a location where the demand for wireless services is expected to rise abruptly. This increase can be effected in a short amount of time, such the Coverage regions 118j (A≦j≦N) can be reconfigured before the expected increase in the demand for wireless services actually materializes.

In accordance with alternative embodiments of the present invention, the above teachings can also be used to respond to the occurrence of multiple critical events at different locations.

In accordance with yet further alternative embodiments of the present invention, the above teachings can be used to respond to the creation of a geographic corridor to support a projected increased demand for wireless services at a given event site. Thus, the vicinity of the event site can be considered a one-, two- or three-dimensional tunnel leading to or emanating from the given event site.

In accordance with still further alternative embodiments of the present invention, the above teachings can be used to respond not only to the occurrence but also to the evolution of a critical event. Specifically, the post-reconfiguration coverage regions 418j (A≦j≦N) can be dynamically reconfigured in response to movement of the site at which the critic event is occurring or is expected to occur.

While specific embodiments of the present invention have been described and illustrated, it will be apparent to those skilled in the art that numerous modifications and variations can be made without departing from the scope of the invention as defined in the appended claims.

The invention claimed is:

1. A cell site for use in a wireless network, comprising:
    an antenna subsystem having antenna response characteristics that allow the cell site to provide wireless services to users within a coverage region;
    a control entity, said control entity configured to receive a first message instructing the cell site to apply an adjustment to the coverage region and, in response, to adjust the antenna response characteristics of the antenna subsystem to move the coverage region towards an event site; and
    the control entity configured to receive a second message instructing the cell site to return to a quiescent state and, in response, to adjust the antenna response characteristics of the antenna subsystem a further time to cause the coverage region to assume at least an original position, size or location.

2. The cell site defined in claim 1, said first message having been generated on a basis of a set of factors including position information regarding the event site and position information regarding the cell site.

3. The cell site defined in claim 2, wherein the event site is associated with an expected future increase in demand for wireless services, and wherein said control entity is configured to adjust the antenna response characteristics of the antenna subsystem prior to a time at which said future increase in demand is expected to occur.

4. The cell site defined in claim 1, wherein to adjust the antenna response characteristics, the control entity is operable to increase a sensitivity of the antenna subsystem in a direction towards the event site and decrease a sensitivity of the antenna subsystem in a direction away from the event site.

5. The cell site defined in claim 4, wherein to adjust the antenna response characteristics, the control entity is operable to effect a power level adjustment operation.

6. The cell site defined in claim 4, wherein to adjust the antenna response characteristics, the control entity is operable to effect a beam forming operation.

7. The cell site defined in claim 1, wherein adjustment of the antenna response characteristics causes the coverage region to move as a function of a distance between the cell site and the event site.

8. The cell site defined in claim 7, wherein adjustment of the antenna response characteristics causes the coverage region to move by an amount that is inversely proportional to the distance between the cell site and the event site, when said distance exceeds a threshold.

9. The cell site defined in claim 1, wherein adjustment of the antenna response characteristics causes the cell site to take over wirelessly servicing a set of users until then serviced by a second cell site closer to the event site.

10. The cell site defined in claim 1, wherein adjustment of the antenna response characteristics causes the cell site to cease wirelessly servicing a subset of said users.

11. The cell site defined in claim 10, said control entity configured to receive a third message instructing the cell site to apply a further adjustment to the coverage region and, in response, to adjust the antenna response characteristics-of the antenna subsystem a further time to move the coverage region away from the event site.

12. The cell site defined in claim 11, said cell site being a first cell site, wherein adjustment of the antenna response characteristics the further time causes the cell site to take over wirelessly servicing a set of users until then serviced by a second cell site closer to the event site.

13. The cell site defined in claim 12, wherein at least some of the users in said set of users until then serviced by the second cell site includes at least one user in said subset of users that the first cell site had ceased to service.

14. The cell site defined in claim 12, said cell site being a first cell site, wherein adjustment of the antenna response characteristics the further time causes the cell site to take over wirelessly servicing a set of zero or more users until then serviced by a second cell site closer to the event site, wherein the set of zero or more users contains fewer users than said subset of users that the first cell site had ceased to service.

15. The cell site defined in claim 1, said control entity being configured to receive a sequence of messages instructing the cell site to apply a dynamic adjustment to the coverage region and, in response, to adjust the antenna response characteristics of the antenna subsystem to correspondingly move the coverage region.

16. A method in a wireless network cell site, the cell site comprising an antenna subsystem having antenna response characteristics that allow the cell site to provide wireless services to users within a coverage region, the method comprising:
    receiving, at the cell site, a first message instructing the cell site to apply an adjustment to the coverage region;
    in response to the first message, adjusting the antenna response characteristics of the antenna subsystem to move the coverage region towards an event site;
    receiving, at the cell site, a second message instructing the cell site to return to a quiescent state; and
    in response to the second message, adjusting the antenna response characteristics of the antenna subsystem a further time to cause the coverage region to assume at least an original position, size, or location.

\* \* \* \* \*